(12) United States Patent
Kurian et al.

(10) Patent No.: US 10,667,140 B2
(45) Date of Patent: May 26, 2020

(54) DYNAMIC FREQUENCY SELECTION PROXY

(71) Applicant: Apple Inc., Cupertino, CA (US)

(72) Inventors: Lawrie Kurian, San Jose, CA (US); Tashbeeb Haque, Cupertino, CA (US); Saravanan Balasubramaniyan, Los Gatos, CA (US); Anand Rajagopalan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 15/494,348

(22) Filed: Apr. 21, 2017

(65) Prior Publication Data

US 2017/0311171 A1 Oct. 26, 2017

Related U.S. Application Data

(60) Provisional application No. 62/325,929, filed on Apr. 21, 2016.

(51) Int. Cl.

| | |
|---|---|
| *H04W 72/08* | (2009.01) |
| *H04L 29/08* | (2006.01) |
| *H04W 16/14* | (2009.01) |
| *H04W 48/12* | (2009.01) |
| *H04W 24/08* | (2009.01) |
| *H04W 76/14* | (2018.01) |
| *H04W 84/12* | (2009.01) |

(Continued)

(52) U.S. Cl.
CPC ........... *H04W 16/14* (2013.01); *H04W 24/08* (2013.01); *H04W 48/12* (2013.01); *H04W 76/14* (2018.02); *H04W 72/0406* (2013.01); *H04W 84/12* (2013.01); *H04W 88/182* (2013.01)

(58) Field of Classification Search
CPC ..... H04W 16/14; H04W 24/08; H04W 48/12; H04W 72/082; H04W 76/23; H04W 84/12; H04W 72/121; H04L 67/1085; H04L 67/104
USPC ....................................................... 370/336
See application file for complete search history.

(56) References Cited

U.S. PATENT DOCUMENTS

| | | | |
|---|---|---|---|
| 2009/0146866 A1* | 6/2009 | Matsumoto ........... | H04W 16/14 342/52 |
| 2014/0003237 A1* | 1/2014 | Kenney ................. | H04W 28/10 370/235 |

(Continued)

*Primary Examiner* — Sithu Ko
*Assistant Examiner* — Vanneilian Lalchintang
(74) *Attorney, Agent, or Firm* — Dickinson Wright LLP

(57) ABSTRACT

Methods and apparatus for an electronic device to perform a dynamic frequency selection (DFS) proxy function are described. An interface circuit of the electronic device receives, from an access point associated with the electronic device, a frame with DFS information that indicates a presence of interference associated with a higher priority user in a shared band of radio frequencies. The frame can include an action frame with a channel switch announcement (CSA) or a beacon with a CSA. In response to receiving the DFS information, the electronic device forwards, to a third electronic device, the DFS information, where the third electronic device is not associated with and does not have a connection to the access point. In this way, the electronic device functions as a DFS proxy for the third electronic device with respect to the shared band of radio frequencies used by the access point.

20 Claims, 6 Drawing Sheets

(51) Int. Cl.
*H04W 88/18* (2009.01)
*H04W 72/04* (2009.01)

(56) References Cited

U.S. PATENT DOCUMENTS

| | | | |
|---|---|---|---|
| 2014/0241187 A1* | 8/2014 | Barkay | H04W 76/23 370/252 |
| 2014/0247746 A1* | 9/2014 | You | H04W 24/06 370/252 |
| 2015/0163828 A1* | 6/2015 | Vandwalle | H04W 52/383 370/330 |
| 2015/0223257 A1* | 8/2015 | Wilhelmsson | H04W 72/082 455/452.1 |
| 2015/0351114 A1* | 12/2015 | Wolf | H04L 67/1085 370/330 |

* cited by examiner

DYNAMIC FREQUENCY SELECTION PROXY

CROSS-REFERENCE TO RELATED APPLICATIONS

This application claims the benefit of U.S. Provisional Patent Application No. 62/325,929, entitled "DYNAMIC-FREQUENCY-SELECTION PROXY" filed Apr. 21, 2016, the content of which is incorporated by reference herein in its entirety for all purposes.

FIELD

The described embodiments relate, generally, to wireless communications among electronic devices in a wireless local area network (WLAN), including electronic devices and techniques for providing a dynamic frequency selection (DFS) proxy in a shared band of frequencies.

BACKGROUND

Many electronic devices communicate with each other using wireless local area networks (WLANs), such as those based on a communication protocol that is compatible with an IEEE 802.11 standard (which is sometimes referred to as 'Wi-Fi'). For example, in some IEEE 802.11 standards, electronic devices can communicate with each other using a shared band of frequencies that has dual use. In particular, the shared band of frequencies may be used by the electronic devices for wireless communication and, occasionally, by a higher priority user, such as a radar system.

In the event that the higher priority user is using the shared band of frequencies, the electronic devices are typically required to discontinue wireless communication in the shared band of frequencies within a predefined time interval. For example, in the United States, channels in the 5470-5725 MHz band of frequencies are dual use for wireless communication and radar systems. When radar signals are detected, electronic devices that are using the shared channels are required by federal regulations to discontinue use within prescribed time, such as within 200 milliseconds. This shared spectrum technique is referred to as 'dynamic frequency selection' (DFS).

In WLANs, DFS is usually implemented by access points that monitor for radar signals and, when the radar signals are detected, that provide instructions to associated electronic devices to discontinue use of the shared band of frequencies, the instructions provided via one or more action frames with channel switch announcements (CSAs) and subsequent beacons that include CSAs. However, many electronic devices may not be able to receive these instructions from an access point. This includes legacy electronic devices, as well as other electronic devices that are not associated with the access point.

Consequently, the legacy electronic devices and the other electronic devices may not be able to use the shared band of frequencies. Instead, the legacy electronic devices and the other electronic devices may use other, more crowded bands of frequencies. The resulting collisions may degrade the communication performance and, thus, may be frustrating to users of the legacy electronic devices and the other electronic devices, which may degrade the user experience.

SUMMARY

Some embodiments that relate to an electronic device that receives a frame from a second electronic device are described. In particular, during operation, an interface circuit in the electronic device may receive the frame from a second electronic device, such as an access point in a WLAN. The frame may include information that indicates a presence of interference associated with a higher priority user in a shared band of frequencies. In response to receiving the frame, the interface circuit may forward an indication of the information to a third electronic device that is not associated with, and does not have a connection to, the second electronic device.

For example, the frame may be an action frame with a channel switch announcement (CSA) and/or a beacon that includes the CSA. Moreover, the information may include dynamic frequency selection (DFS) information. Thus, the electronic device may serve as a DFS proxy in the shared band of frequencies.

The electronic device may be associated with the second electronic device. Furthermore, the electronic device and the third electronic device may communicate via a peer-to-peer communication technique.

In some embodiments, the electronic device receives the frame from the second electronic device via a communication protocol in the shared band of frequencies that differs from a second communication protocol in the shared band of frequencies that the electronic device uses to forward indication of the information to the third electronic device.

Additionally, the interface circuit of the electronic device may provide a target beacon transmission time of the second electronic device to the third electronic device to facilitate monitoring, by the third electronic device, of beacons transmitted by the second electronic device.

In some embodiments, the electronic device monitors beacons received from the access point and communicates to the third electronic device an indication of an elapsed time since a most recently received beacon was received from the second electronic device. In some embodiments, The electronic device receives from the third electronic device indications of elapsed times for most recently received beacons received by the third electronic device from the second electronic device. In some embodiments, the electronic device stops transmission in the shared band of radio frequencies when (i) the elapsed time since the most recently received beacon from the second electronic device received by the electronic device exceeds an interval threshold and (ii) an indication received from the third electronic device indicates the elapsed time since the most recently received beacon received by the third electronic device from the second electronic device also exceeds the interval threshold. In some embodiments, the second electronic device is an access point, the electronic device is a client device associated with and/or connected to the access point, and the third electronic device is a client device in peer-to-peer communication with the electronic device and is not associated with and/or connected to the access point.

Other embodiments include operation with and/or by the third electronic device.

Other embodiments provide an interface circuit in the electronic device or the third electronic device.

Other embodiments provide a computer-program product for use with the interface circuit in the electronic device or the third electronic device. This computer-program product includes instructions for at least some of the aforementioned operations performed by the interface circuit in the electronic device or the third electronic device.

Other embodiments provide a method for serving as a DFS proxy for a shared band of frequencies. The method includes at least some of the aforementioned operations performed by the interface circuit in the electronic device or the third electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
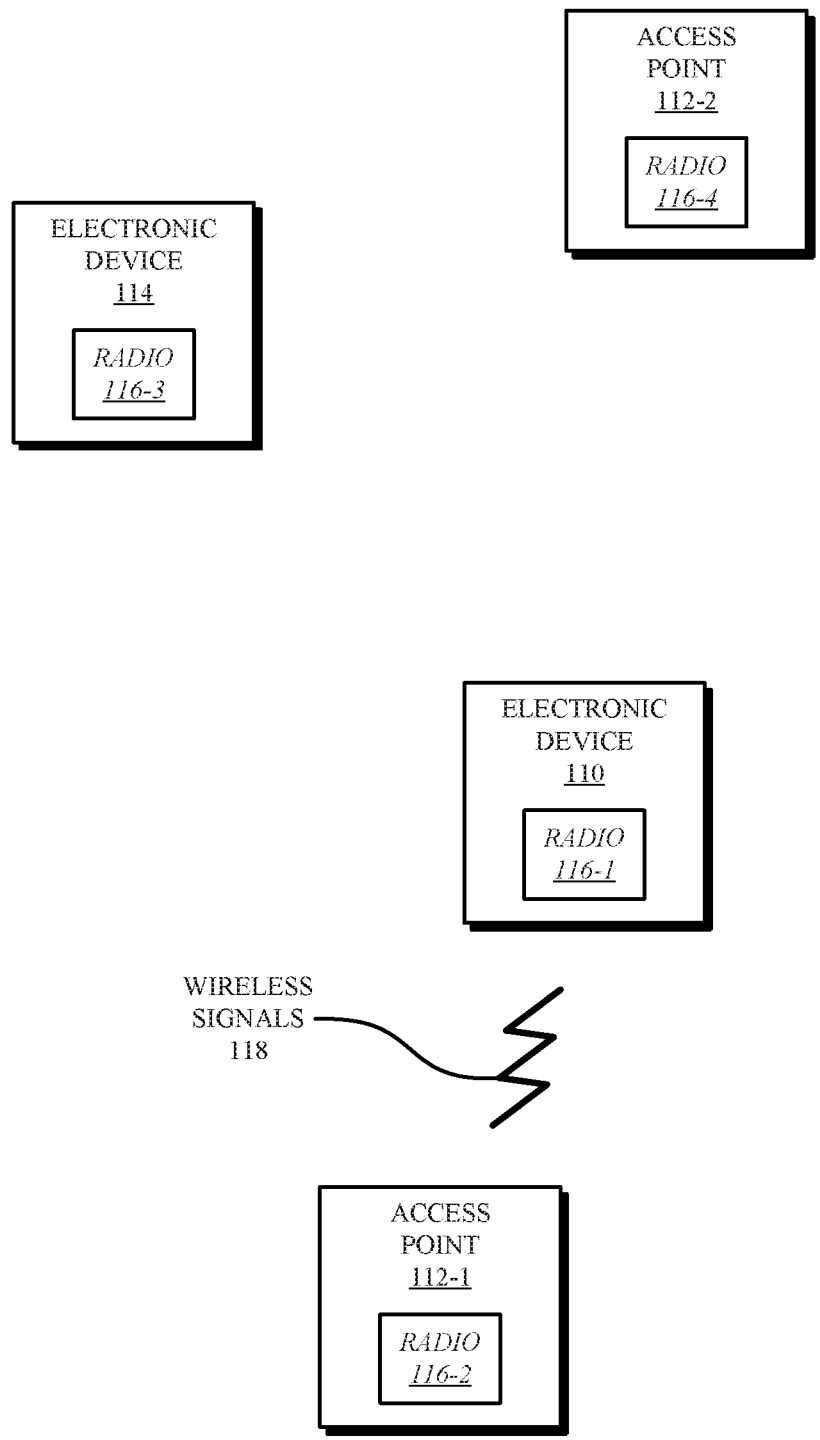
FIG. 1 is a block diagram illustrating an example of electronic devices communicating wirelessly.

An electronic device that receives a frame from a second electronic device (such as an access point in a WLAN) is described. During operation, an interface circuit in the electronic device may receive, from the second electronic device, a frame with dynamic frequency selection (DFS) information that indicates a presence of interference associated with a higher priority user in a shared band of frequencies. For example, the frame may include an action frame with a channel switch announcement (CSA) and/or a beacon that includes the CSA. In response to receiving the DFS information, the electronic device may forward, to a third electronic device, the DFS information (or an indication of the DFS information), where the third electronic device is not associated with, and does not have a connection to, the second electronic device. In this way, the electronic device may function as a DFS proxy for the third electronic device, e.g., when operating in the shared band of frequencies.

By using the electronic device as a DFS proxy for the third electronic device when operating in the shared band of frequencies, this communication technique may allow additional electronic devices to use such a shared band of frequencies. For example, the communication technique may allow a legacy electronic device, which is not able to associate with or establish a connection to the second electronic device, to use the shared band of frequencies when communicating with the electronic device. Alternatively or additionally, the communication technique may allow another electronic device, which is currently unable to associate with or establish a connection to the second electronic device, to use the shared band of frequencies when communicating with the electronic device. In some embodiments, the third electronic device may be unable to detect the presence of a higher priority user in the shared band of frequencies on its own. In some embodiments, the third electronic device is not associated with and/or connected to the second electronic device. In some embodiments, the second electronic device controls communication in the shared band of frequencies based on detection of the presence of higher priority users of the shared band of frequencies. In some embodiments, the third electronic device may be capable of associating with and/or connecting to the second electronic device but has not done so. The ability to use the shared band of frequencies may provide the electronic device and the third electronic device with additional radio frequency bandwidth with reduced collisions with other traffic, and thus may improve communication performance for communication between the electronic device and the third electronic device (e.g., it may reduce communication latency). Consequently, the communication technique may improve the user experience when using the electronic device or the third electronic device, and thus may increase customer satisfaction and retention.

Note that the communication technique may be used during wireless communication between electronic devices in accordance with a communication protocol, such as: an Institute of Electrical and Electronics Engineers (IEEE) 802.11 standard (which is sometimes referred to as Wi-Fi). For example, the communication technique may be used with IEEE 802.11ac, which is used as an illustrative example in the discussion that follows. However, this communication technique may also be used with a wide variety of other communication protocols, and in electronic devices (such as electronic devices and, in particular, mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the second electronic device can act as a communications hub that provides access to a WLAN and/or to a WWAN and, thus, to a wide variety of services that can be supported by various applications executing on the second electronic device. Thus, the second electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe the communication technique. FIG. 1 presents a block diagram illustrating an example of electronic devices communicating wirelessly. In particular, electronic device 110 (such as a smartphone, a laptop computer, a notebook computer, a tablet, or another such electronic device, which is sometimes referred to as a 'primary electronic device') and access point 112-1 may communicate wirelessly in a wireless local area network (WLAN) using an IEEE 802.11 communication protocol. Thus, electronic device 110 may be associated with access point 112-1. For example, electronic device 110 and access point 112-1 may wirelessly communicate while: detecting one another by scanning wireless channels, transmitting and receiving beacons or beacon frames on wireless channels, establishing connections (for example, by transmitting connection requests), and/or transmitting and receiving packets or frames (which may include the connection requests and/or additional information, such as data, as payloads). Access points 112 may provide access to a network, such as the Internet, via an Ethernet protocol, and may be a physical access point or a virtual access point that is implemented on a computer.

In addition, electronic device 110 may communicate wirelessly with another electronic device 114 (such as a smartwatch, a tablet, a notebook, a smartphone, or other such electronic device, which is sometimes referred to as a 'peripheral electronic device' or a 'secondary electronic device') using a different communication protocol, such as AWDL, neighbor awareness networking (NAN) or, more generally, a peer-to-peer communication technique. (A wide variety of communication techniques may be used during the communication between electronic device 110 and electronic device 114, including an IEEE 802.11 communication protocol, which may be the same as or different from the IEEE 802.11 communication protocol used during wireless communication between electronic device 110 and access point 112-1.) Therefore, electronic device 114 may not be associated with or may not have a connection to access point 112-1. Consequently, there may not be direct wireless communication between electronic device 114 and access point 112-1. Alternatively, as described further below, in some embodiments, electronic device 114 may receive communications, such as beacons, transmitted by access point 112-1.

As described further below with reference to FIG. 6, electronic device 110, access points 112 and electronic device 114 may include subsystems, such as a networking subsystem 614, a memory subsystem 612, and a processing subsystem 610. In addition, electronic device 110, access points 112, and electronic device 114 may include radios 116 as part of the networking subsystems 614. More generally, electronic device 110, access points 112 and electronic device 114 can include (or can be included within) any electronic devices with networking subsystems that enable electronic device 110, access points 112 and electronic device 114 to wirelessly communicate with another electronic device. This can include transmitting beacons on wireless channels to enable electronic devices to make initial contact with or to detect each other, followed by exchanging subsequent data/management frames (such as connect requests) to establish a connection, configure security options (e.g., IPSec), transmit and receive packets or frames via the connection, etc.

As illustrated in FIG. 1, wireless signals 118 (represented by a jagged line) are communicated by radios 116-1 and 116-2 in electronic device 110 and access point 112-1, respectively. For example, as noted previously, electronic device 110 and access point 112-1 may exchange packets using a Wi-Fi protocol in a WLAN. This communication may occur in one or more radio frequency (RF) channels in a shared band of radio frequencies, such as in the 3.65 GHz RF band or the 5 GHz RF band (which are used for illustrative purposes and are not intended to be limiting). The shared band of radio frequencies used by electronic device 110 and access point 112-1 may be shared with one or more higher priority users, e.g., with separate radar systems and/or by first responder radios. In order to comply with applicable communications regulations associated with the shared band of radio frequencies, such as rules mandated by the Federal Communications Commission (FCC) in the United States, or similarly by a regulatory agency in other regions, access point 112-1 may monitor the shared band of radio frequencies for the presence of signals associated with the one or more higher priority users. When access point 112-1 detects the presence of such signals, access point 112-1 may provide information that indicates the presence of the signals from higher priority users in the shared band of radio frequencies to electronic device 110. (More generally, directly or indirectly, such as via the information, access point 112-1 may instruct electronic device 110 to discontinue using the shared band of radio frequencies.) In response, electronic device 110 may discontinue using the shared band of radio frequencies. Discontinuance may be required to occur within a prescribed time period of communication of the information. For example, electronic device 110 may transition the communication to one or more RF channels in another band of radio frequencies that is not shared with the one or more higher priority users, such as to a different RF channel in the 5 GHz band or to an RF channel in the 2.4 GHz band of radio frequencies (which is used for illustrative purposes and is not intended to be limiting). Thus, access point 112-1 may facilitate implementation of DFS and, more generally, discontinuing the use of the shared band of radio frequencies by electronic device 110 within a time interval (such as in less than 200 milliseconds) in the WLAN. As described further below with reference to FIG. 5, access point 112-1 may communicate the information (which is sometimes referred to as 'DFS information') in one or more frames, such as in one or more action frames with CSAs and/or in one or more beacons that include CSAs.

Electronic device 114 may be unable to monitor the shared band of radio frequencies directly for the presence of signals associated with the one or more higher priority users, e.g., hardware to perform such a function may be lacking and/or included but not enabled. In addition, because electronic device 114 is not associated with or connected to access point 112-1, electronic device 114 may be unable to receive the DFS information directly from access point 112-1. Because of regulatory requirements associated with the shared band of radio frequencies, this inability to monitor for the presence of signals associated with the one or more higher priority users (either directly or via communication from access point 112-1) may preclude electronic device 114 from communicating with electronic device 110 using the shared band of radio frequencies, which may degrade communication performance during the communication between electronic devices 110 and 114.

In order to address this challenge, electronic device 110 may provide or function as a DFS proxy for electronic device 114 for the shared band of radio frequencies. This capability may allow electronic devices 110 and 114 to communicate with each other using the shared band of radio frequencies.

In particular, when electronic device 110 receives information that indicates the presence of the signals in the shared band of radio frequencies from access point 112-1, electronic device 110 may forward the information (or an indication or representation of the information, i.e., something other than the information that specifies or conveys the information) to electronic device 114. In response, electronic device 114 may discontinue using the shared band of radio frequencies. For example, electronic device 114 may transition the communication to one or more RF channels in another band of radio frequencies that are not shared with higher priority users. Thus, electronic device 110 may act as a DFS proxy that facilitates implementation of DFS and, more generally, discontinuing the use of the shared band of radio frequencies by electronic device 114 within a predetermined time interval (such as within 200 milliseconds) in the WLAN.

More generally, using the communication technique, electronic device 110 may alert electronic device 114 to the presence of interference (such as to the presence of signals from higher priority users) in the shared band of radio frequencies, where the electronic device 114 is unable to detect the presence of the interference directly. In some embodiments, the communication technique may allow collaborative sharing of DFS information among a set of electronic devices, so that a subset of electronic devices that receive (or are able to receive) DFS information from one or more access points can forward the DFS information (or an indication of the DFS information) to a remainder of the electronic devices that did not receive or are unable to receive the DFS information directly from the one or more access points (such as a legacy electronic device or an electronic device that is out of wireless communication range of the one or more access points) and/or are unable to detect the presence of the use of the shared radio frequency bands by a higher priority user.

In some embodiments, electronic device 114 monitors passively for the information from access point 112-1 about the presence of higher priority users or interference. For example, if electronic device 114 is within wireless communication range of access point 112-1, electronic device 114 may receive a beacon with information from access point 112-1. In order to facilitate this passive monitoring by electronic device 114, which may be not associated with and/or not connected to the access point 112-1, electronic device 110 may provide additional information to electronic device 114 that indicates that electronic device 110 is associated with access point 112-1 (i.e., that specifies which access point electronic device 110 is associated with). Furthermore, the additional information may include a target beacon transmission time (TBTT) and/or a beacon interval of access point 112-1, which may allow electronic device 114 to turn on or transition to an active mode and to listen for a beacon from access point 112-1 at an appropriate time.

In some embodiments, both electronic device 110 and electronic device 114 monitor for beacons from access point 112-1, where electronic device 110 is associated with access point 112-1, while electronic device 114 uses information about beacons for access point 112-1 provided to electronic device 114 from electronic device 110. In some embodiments, both electronic device 110 and electronic device 114 monitor for beacons from access point 112-1. Electronic device 110 can be associated with access point 112-1, while electronic device 114 can be not associated with access point 112-1 but can receive information about beacons for access point 112-1 (e.g., TBTT and/or beacon intervals and/or beacon radio frequencies, etc.) from electronic device 110. In some embodiments, each of electronic device 110 and electronic device 114 will use a shared band of radio frequencies only while able to monitor beacons from access point 112-1 (directly or indirectly) and will discontinue use of the shared band of radio frequencies when unable to monitor the beacons from access point 112-1, e.g., when both electronic device 110 and electronic device 114 are unable to receive beacons (or information about beacons) from access point 112-1 for a period of time. In some embodiments, electronic device 110 and electronic device 114 communicate information about beacons received from the access point 112-1 to each other. In some embodiments, electronic device 110 and electronic device 114 will communicate data to each other in the shared band of radio frequencies only when both electronic device 110 and electronic device 114 are able to receive beacons from access point 112-1. In some embodiments, both electronic device 110 and electronic device 114 are required to monitor beacons from access point 112-1. In some embodiments, electronic device 110 and electronic device 114 send an action frame to the corresponding other electronic device 110/114, the action frame including an indication of an amount of time elapsed since the last beacon was received from access point 112-1. In some embodiments, the action frame includes a maximum elapsed time allowed for no beacons to be received from access point 112-1. In some embodiments, the action frame includes a beacon interval, e.g., a time between successively transmitted beacons for access point 112-1. In some embodiments, the action frame includes the amount of time elapsed since the last beacon, the maximum elapsed time between successively received beacons, and a beacon interval time formatted as a time length value (TLV) frame with all three pieces of information included. In some embodiments, an existing standardized TLV frame is re-used to carry the information about beacons. In some embodiments, a new formatted TLV frame is introduced to carry the information about beacons. In some embodiments, only the time elapsed since the last beacon is included in the TLV frame. In some embodiments, a maximum allowed elapsed time between successive received beacons is a constant. In some embodiments, the access point 112-1 communicates the maximum allowed elapsed time between successively received beacons before data transmission should be halted. In some embodiments, the time between successively transmitted beacons for the access point 112-1 is included in one or more beacons from the access point 112-1.

In some embodiments, each of the electronic device 110 and electronic device 114 stops transmission of data packets in a shared band of radio frequencies, e.g., stops use of a DFS RF channel in the 5 GHz RF band, in response to determining that both electronic device 110 and electronic device 114 have not received a beacon from access point 112-1 for an elapsed time that exceeds a pre-determined interval threshold, e.g., exceeding a maximum elapsed time between successively received beacons communicated in a TLV frame. In some embodiments, electronic device 110, which is associated with access point 112-1, uses any transmission, whether a data frame or a beacon frame, received from the access point 112-1 to reset the time since last beacon for electronic device 110. Thus, either a beacon frame or a data frame, in some embodiments, can reset the elapsed time interval for electronic device 110. In some embodiments, electronic device 114 is not associated with access point 112-1, and only beacon frames received from access point 112-1 by electronic device 114 resets the time since last beacon for electronic device 114. In some embodiments, when both electronic device 110 and electronic device 114 are muted (restricted from data transmission) on the shared band of radio frequencies, electronic device 110 and electronic device 114 each continue to send at least one action frame to each other using the shared band of radio frequencies. In some embodiments, while both electronic device 110 and electronic device 114 are muted (restricted from data transmission) on the shared band of radio frequencies, electronic device 110 and electronic device 114 communicate data between each other using another RF channel that is not in the shared band of radio frequencies, e.g., a non-DFS RF channel in the 5 GHz RF band or an RF channel in the 2.4 GHz RF band. In some embodiments, when electronic device 110 or electronic device 114 (or both) include multiple radios (or wireless circuitry that allows for communication on at least two different RF channels), the multi-radio device (electronic device 110, electronic device 114, or both electronic device 110 and electronic device 114) monitor for beacons from access point 112-1 using a first radio while communicating with each other using a second radio. In some embodiments, when electronic device 110 or electronic device 114 receives a beacon from access point 112-1 that indicates use of the RF channel in the shared RF band is permitted, e.g., a beacon without a CSA, the electronic devices 110/114 negotiate to switch data traffic back to the RF channel in the shared RF band.

In these ways, the communication technique may allow electronic device 110 to provide situational awareness to electronic device 114 about DFS information (and, more generally, the presence of interference) in the shared band of radio frequencies. Consequently, the communication technique may facilitate the use of the shared band of radio frequencies and, thus, improve communication performance when communicating with electronic device 114. These capabilities may improve the user experience when using electronic device 110 and/or electronic device 114.

In the described embodiments, processing a packet or frame in one of electronic device 110, access points 112 and/or electronic device 114 includes: receiving wireless signals 118 encoding a packet or a frame; decoding/extracting the packet or frame from received wireless signals 118 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as one to ten seconds) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

In some embodiments, electronic device 114 is initially associated with access point 112-2. If electronic devices 110 and 114 are in an extended service set (ESS), electronic device 114 may migrate from access point 112-2 to access point 112-1. Then, the communication technique may proceed as described previously. In some embodiments, when electronic devices 110 and 114 are associated with different access points, electronic device 110 may serve as or may provide a DFS proxy for electronic device 114 for the shared band of frequencies. In this way, electronic device 110 may provide the DFS information from access point 112-1 to electronic device 114 when access point 112-1 detects signals associated with the one or more higher priority users before access point 112-2 detects those signals. In some embodiments, when electronic device 110 is associated with access point 112-1 that uses a first DFS RF channel and electronic device 114 is associated with access point 112-2 that uses a second DFS RF channel, each of electronic device 110 and electronic device 114 can provide DFS information received from their respective access points to the other corresponding electronic device. For example, electronic device 110 can provide information about an action frame with a CSA for access point 112-1 to electronic device 114, while electronic device 114 can provide information about an action frame with a CSA for access point 112-2 to electronic device 110. In some embodiments, when electronic device 110 and electronic device 114 are each connected to different access points, e.g., to access point 112-1 and access point 112-2 respectively, electronic devices 110 and 114 can communicate data between each other using a non-DFS channel and can insert quiet periods on which to listen for beacons (and/or action frames) from their respective access points 112-1 and 112-2.

While the preceding discussion illustrated the communication technique with electronic device 110 serving as (or providing) a DFS proxy for electronic device 114 based on DFS information received from access point 112-1, in other embodiments electronic device 110 may detect the signals associated with the one or more higher priority users directly. Then, electronic device 110 may provide the DFS information to electronic device 114. In some embodiments, electronic device 114 can list for and detect signals associated with one or more higher priority users directly and react appropriately. In some embodiments, electronic device 114 can provide information about the detection of signals associated with one or more higher priority users to electronic device 110 (and/or vice versa).

Note that, in some embodiments, the shared band of radio frequencies includes a single RF channel. More generally, the shared band of radio frequencies may include one or more RF channels, which may be in a continuous band of radio frequencies or in a band of radio frequencies that includes gaps or radio frequencies that are not used for communications.

Figure 2:
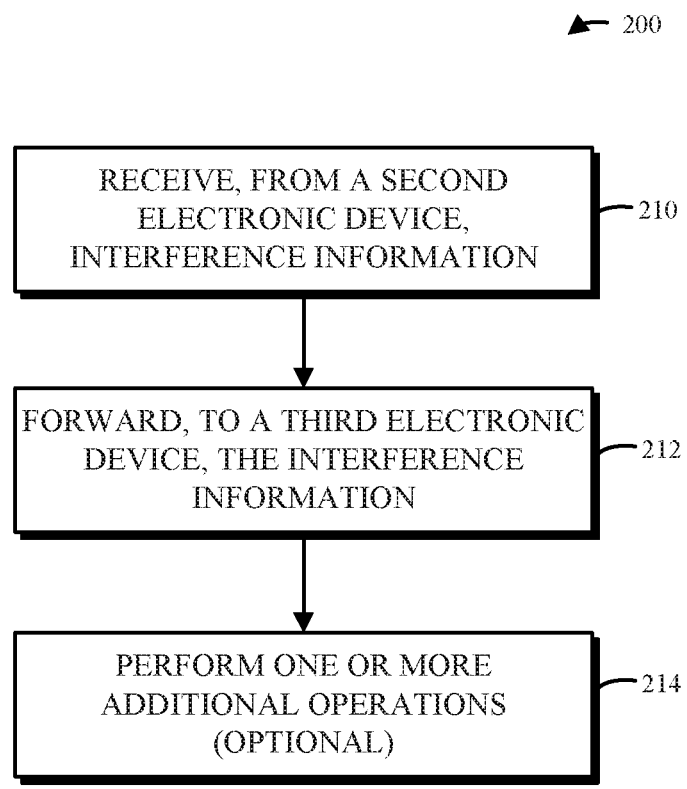
FIG. 2 is a flow diagram illustrating an example of a method for serving as a DFS proxy for a shared band of frequencies using one of the electronic devices in FIG. 1.

FIG. 2 presents a flow diagram illustrating an example method 200 for serving as a DFS proxy for a shared band of frequencies, in accordance with some embodiments. This method may be performed by an electronic device, such as an interface circuit in electronic device 110 in FIG. 1. During operation, the electronic device receives, from a second electronic device, information, such as interference information (operation 210), that indicates a presence of interference associated with a higher priority user in the shared band of frequencies. For example, the second electronic device may include an access point, and the electronic device may be associated with or may have a connection to the second electronic device. Moreover, the information may include DFS information. Therefore, the information may be received in an action frame with a CSA and/or in a beacon frame, which may also include a CSA.

In response, the electronic device forwards, to a third electronic device, the interference information (operation 212) or an indication of the interference information, where the third electronic device is not associated with and does not have a connection to the second electronic device. Therefore, the electronic device may serve as a proxy for the DFS information (a DFS proxy) with respect to the shared band of radio frequencies. In some embodiments, the interference information (or more specifically DFS information) provided by the electronic device to the third electronic device is formatted as an action frame.

In some embodiments, the electronic device and the third electronic device may communicate via a peer-to-peer communication technique. Furthermore, the receiving (operation 210) may involve a communication protocol in the shared band of frequencies that is different than a second communication protocol in the shared band of frequencies that is used during the forwarding.

In some embodiments, the electronic device optionally performs one or more additional operations (operation 214). For example, the electronic device may provide, to the third electronic device, information that specifies or otherwise identifies the second electronic device (which the electronic device may be associated with) and/or a target beacon transmission time (TBTT) of the second electronic device to facilitate monitoring, by the third electronic device, of beacons transmitted by the second electronic device.

Alternatively or additionally, based on the information, the electronic device may discontinue using the shared band of radio frequencies. For example, the electronic device, in conjunction with the third electronic device, may transition to a different band of radio frequencies (e.g., one or more radio frequency bands for which DFS requirements do not apply), so that the electronic device and the third electronic device can continue communicating with each other. The one or more radio frequency bands (which may be shared bands of radio frequencies, such as the 2.4 GHz RF band) may not be governed by the same rules as the original shared band of radio frequencies.

In some embodiments, the electronic device stops transmission of data within a radio frequency band shared with higher priority users when an elapsed time since a most recently received beacon from the access point with which the electronic device is associated exceeds an interval threshold. In some embodiments, the electronic device communicates to the third electronic device an indication that communication in the radio frequency band shared with higher priority users should be halted when the elapsed time since a most recently received beacon from the access point exceeds the interval threshold. In some embodiments, the electronic device provides to the third electronic device information about beacons for the access point to which the electronic device is associated, and the third electronic device separately monitors for beacons from the access point. In some embodiments, the third electronic device communicates to the electronic device information about the reception of beacons of the access point with which the electronic device is associated (and/or reception of beacon information from the electronic device). In some embodiments, each of the electronic device and the third electronic device, which may be communicating via a peer-to-peer communication protocol with each other in a shared band of radio frequencies that may include the detectable presence of higher priority users, monitors for beacons from one or more access points with which at least one of the electronic device and the third electronic device are associated. In some embodiments, each of the electronic device and the third electronic device communicate to each other information, e.g., in an action frame, about beacons received directly or indirectly from one or more access points. In some embodiments, the information communicated includes at least an elapsed time since a most recently received beacon from an access point. In some embodiments, each of the electronic device and the third electronic device can individually determine to stop transmitting data packets to each other, when using the shared radio frequency band that can include higher priority users, when elapsed times for most recently received beacons (or information about beacons) for both the electronic device and the third electronic device exceed an associated interval threshold. In some embodiments, the electronic device monitors beacons, while the third electronic device monitors information messages (e.g., action frames with information about beacons) from the electronic device. In some embodiments, both the electronic device and the third electronic device monitor beacons from the access point. In some embodiments, an interval threshold for a maximum allowed elapsed time between beacons received by the electronic device (or by the third electronic device) is configured by the access point or by the electronic device (or by the third electronic device). In some embodiments, the maximum allowed elapsed time between beacons received by the electronic device (or by the third electronic device) is based at least in part on a time interval between successive beacons specified by the access point. In some embodiments, an interval threshold for a maximum allowed elapsed time between information messages about beacons received by the third electronic device is configured by one of: the access point, the electronic device, or the third electronic device. In some embodiments, the maximum allowed elapsed time between beacons (or between messages with information about beacons) is based at least in part on a time interval between successive beacons specified by the access point. In some embodiments, a time interval between successive beacons is embedded in the beacon transmitted by the access point. In some embodiments, In some embodiments, when the electronic device is connected to the access point and therefore in active data communication with (and not solely associated with but not connected to the access point), the electronic device monitors data transmissions in addition to beacons received from the access point and updates (or resets) an elapsed time since the last received beacon based on the reception of a data transmission from the access point or a beacon from the access point. In some embodiments, when the electronic device or the third electronic device determines to stop data transmission between them based at least in part on an elapsed time from a most recently received beacon (or information about a beacon) exceeds an associated interval threshold, the electronic device or the third electronic device signals to the other electronic device to stop data transmission. In some embodiments, the signal is communicated in the shared radio frequency band, while, in some embodiments, the signal is communicated in another different radio frequency band that is not shared with high priority users. In some embodiments, both the electronic device and the third electronic device, after muting their respective data transmissions in the radio frequency band shared with high priority users, continue their data transmission with each other in another different radio frequency channel (or RF band), e.g., in an RF channel that is not shared with high priority users, in a non-DFS channel, or the like. In some embodiments, the electronic device and the third electronic device communicate in an RF channel or RF band that is not shared with high priority users using wireless circuitry that is separate from wireless circuitry used for communication in the shared RF band, e.g., in a DFS channel. In some embodiments, the electronic device and/or the third electronic device monitor for beacons from the access point using another set of wireless circuitry that is separate from wireless circuitry used for data communication between them and, upon reception of a beacon from the access point that does not include a CSA, switch that data transmission back to the shared RF band, e.g., back to a previously used DFS channel.

Figure 3:
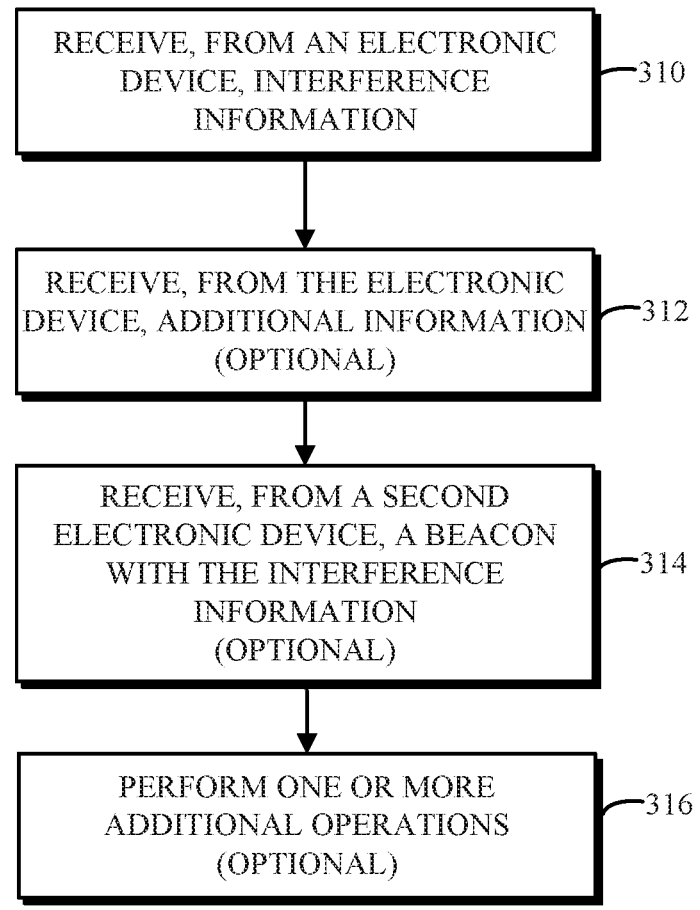
FIG. 3 is a flow diagram illustrating an example of a method for receiving information from a DFS proxy for a shared band of frequencies using one of the electronic devices in FIG. 1.

FIG. 3 presents a flow diagram illustrating an example method 300 for receiving information from a DFS proxy for a shared band of radio frequencies in accordance with some embodiments. This method may be performed by an electronic device, e.g., a third electronic device, such as by an interface circuit in electronic device 114 in FIG. 1. During operation, the third electronic device receives, from an electronic device, information, such as interference information (operation 310), that indicates a presence of interference associated with a higher priority user in the shared band of radio frequencies. For example, the information may include DFS information. In some embodiments, the electronic device and the third electronic device may be engaged in peer-to-peer communications using the shared band of radio frequencies. In some embodiments the interference information (or more specifically DFS information) provided by the electronic device to the third electronic device is formatted as an action frame.

The third electronic device may optionally receive, from the electronic device, additional information (operation 312) that specifies a second electronic device (such as an access point that the electronic device may be associated with) and/or a target beacon transmission time of the second electronic device to facilitate monitoring, by the third electronic device, of beacons transmitted by the second electronic device. Therefore, the third electronic device may optionally receive, from the second electronic device, a beacon with the interference information (operation 314). In some embodiments, the third electronic device may be required to monitor beacons from the second electronic device based on information provided to the third electronic device by the electronic device to facilitate beacon monitoring, such as when the third electronic device is not associated with the second electronic device directly.

In some embodiments, the third electronic device optionally performs one or more additional operations (operation 316). For example, based on the information, the third electronic device may discontinue using the shared band of radio frequencies. In particular, the third electronic device, in conjunction with the electronic device, may transition to a different band of radio frequencies (e.g., radio frequencies for which DFS-based rules do not apply), so that the third electronic device and the electronic device can continue communicating with each other. In some embodiments, as discussed hereinabove with respect to FIG. 2, the electronic device and the third electronic device can each monitor beacons and communicate an elapsed time since a most recently received beacon to each other. In some embodiments, the electronic device and the third electronic device can each determine whether to halt data transmission with each other based at least in part on a time elapsed since the reception of beacon from the second electronic device by each of the electronic device and the third electronic device. In some embodiments, after one (or both) of the electronic device or the third electronic device determines to halt data transmission, the electronic device or the third electronic device communicates with the respective peer electronic device to indicate that data transmission by the peer electronic device should be halted. In some embodiments, data transmission between the electronic device and the third electronic device is halted based on a time elapsed since a most recently received beacon, and the data transmission is transferred to a different RF channel and/or different RF band that does not include interference from higher priority users and continues in the different RF channel/band. In some embodiments, the electronic device and/or the third electronic device continue to monitor for beacons, after transferring the peer-to-peer data communication to the different RF channel/band, and when beacons indicate that the original RF channel and/or original RF band is available (e.g., does not include interference from higher priority users) the data transmission is transferred back to the original RF channel/band.

In some embodiments of methods 200 (FIG. 2) and/or 300, there may be additional or fewer operations. Moreover, the order of the operations may be changed, and/or two or more operations may be combined into a single operation.

In some embodiments, at least some of the operations in method 200 (FIG. 2) and/or in method 300 (FIG. 3) are performed by interface circuits in the electronic device or in the third electronic device. For example, at least some of the operations may be performed by firmware executed by an interface circuit, such as firmware associated with a MAC layer, as well as one or more circuits in a physical layer in the interface circuit.

Figure 4:
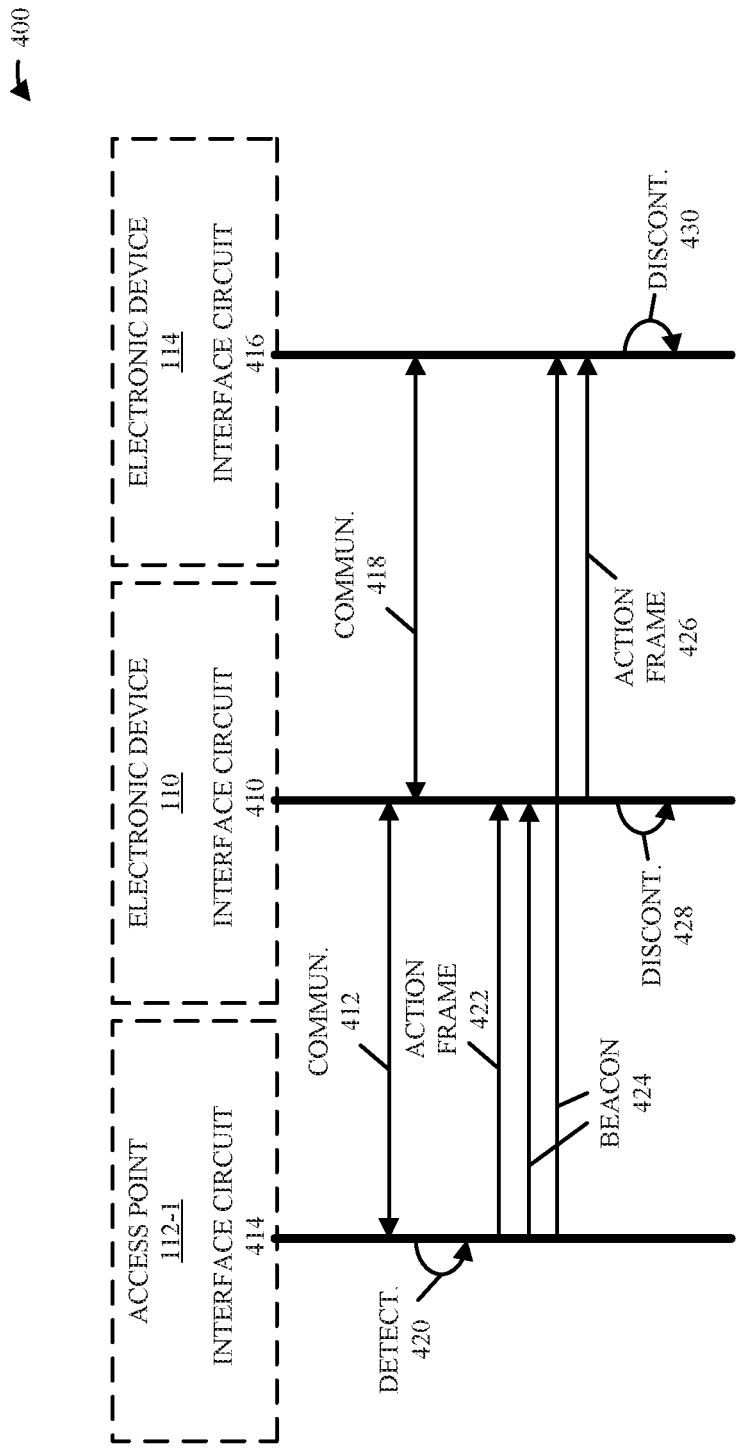
FIG. 4 is a flow diagram illustrating an example of communication between electronic devices, such as the electronic devices of FIG. 1.

The communication techniques are further illustrated in FIG. 4, which presents a flow diagram 400 illustrating an example of communication between electronic device 110, access point 112-1 and electronic device 114 in accordance with some embodiments. In particular, interface circuit 410 of electronic device 110 may communicate 412 with interface circuit 414 of access point 112-1 using Wi-Fi in a shared band of radio frequencies. Interface circuit 416 of electronic device 114 may communicate 418 with interface circuit 410 using a peer-to-peer communication protocol in the shared band of radio frequencies.

Subsequently, interface circuit 414 may detect 420 signals associated with a higher priority user in the shared band of radio frequencies. In response, interface circuit 414 may transmit an action frame 422 to electronic device 110 and/or transmit a beacon 424 to electronic device 110. Note that the action frame 422 and/or the beacon 424 may include information (such as DFS information or a CSA) that indicates the presence of the signals in the shared radio frequency band.

Next, interface circuit 410 may receive action frame 422 and/or beacon 424. In response to the information in action frame 422 and/or beacon 424, interface circuit 410 may forward the information (or an indication of the information) in an action frame 426 to electronic device 114. In addition, interface circuit 410 may discontinue 428 use of the shared radio frequency band.

Furthermore, when interface circuit 416 receives action frame 426, interface circuit may extract the information and based on the information may discontinue 430 use of the shared radio frequency band. Alternatively or additionally, interface circuit 416 may passively receive beacon 424 (e.g., through an association or a connection to access point 112-1, or based on information provided by electronic device 110 on how/when to receive beacons from the access point 112-1), and based on the information included in beacon 424, interface circuit 416 may discontinue 430 use of the shared radio frequency band.

We now describe exemplary embodiments of the communication technique. Per regulatory requirements, e.g., Federal Communications Commission (FCC) requirements, when an electronic device is not a DFS master or a DFS slave (i.e., connected to a DFS master), the electronic device may not be allowed to operate on DFS channels controlled by the DFS masster.

Consequently, for an AWDL/NAN link between two peer electronic devices, where one peer electronic device, which may be referred to as peer A, (a DFS slave) is connected to an access point (the DFS master) in a DFS channel and another peer electronic device, which may be referred to as peer B, is not associated with an infrastructure access point and is not a DFS master, an AWDL/NAN link cannot operate in a DFS channel because peer B cannot comply with regulatory requirements, e.g., does not have the capability to detect radar signals and to vacate use of the DFS channel when required. Because peer B does not have the capability to detect the radar signals, it could potentially continue using the DFS channel and, therefore, could interfere with the radar signals, thereby violating the FCC regulatory requirement.

Because the AWDL/NAN link cannot use the DFS channel in this case, the AWDL/NAN link may have to use a non-DFS channel and may periodically switch back to the infrastructure DFS channel to the receive a beacon. When it switches back to the DFS channel, the AWDL/NAN data transfer on the non-DFS channel may be blocked, which can result in poor performance for latency-sensitive applications.

In order to permit peer-to-peer communication on a DFS channel when at least one peer electronic device is neither a DFS master nor a DFS slave, peer A may act as a DFS proxy for peer B, relaying DFS-related information (which is sometimes referred to as 'DFS information'), such as the CSA, received from its infrastructure access point to peer B. Moreover, the AWDL/NAN link may be maintained on the DFS channel, with peer A monitoring for DFS information from its infrastructure access point and keeping peer B updated on the presence of beacons and/or on action frames received from the infrastructure access point.

An AWDL/NAN electronic device connected to or associated with an infrastructure access point (which is capable of operating on a DFS channel) may roam to an access point that operates on a channel in the 2.4 GHz RF band before establishing an AWDL/NAN data link with an AWDL/NAN peer electronic device. However, roaming to the 2.4 GHz RF band can be time consuming and at times may not be reliable.

In absence of a 2.4 GHz RF band roaming candidate access point, a client station electronic device that uses an AWDL/NAN link may silence itself periodically during certain time periods, e.g., in a set of consecutive one or more time slots (e.g., two 64 millisecond time slots or for a total of 128 milliseconds) during which the client station electronic device can receive beacons and/or action frames from an access point and/or during which the access point (and/or the client station electronic device) can monitor for signals from higher priority users. Instead of using a DFS channel for the AWDL/NAN link, the client station electronic device only transmits using non-DFS RF channels, e.g., during so-called "social" RF channel time slots (such as using RF channel 149). The quiet period (128 milliseconds) allotted to the DFS channel monitoring, however, may impact performance of latency sensitive applications, such as AirPlay® Mirroring.

Consequently, there is a need for a DFS proxy to allow for transmission between two electronic devices using a DFS channel where one of the two electronic devices is not directly associated with an access point that uses the DFS channel and instead receives information about interference (and/or of higher priority users) or other messages that can control use of the DFS channel from the access point indirectly via the electronic device that is associated with and/or connected to the access point. Notably, the prevalent deployments of access points that use the 5 GHz RF band and operate on DFS channels in the 5 GHz RF band. Moreover, the 2.4 GHz RF channels can be overcrowded, while the 5 GHz RF DFS channels are often less crowded. Typically, there may not be roaming candidates when an AWDL/NAN electronic device has a DFS infrastructure connection because of the diminished density of access points operating on the 2.4 GHz RF channels. Thus, a DFS proxy may be needed in order to improve the user experience for low-latency application when an AWDL/NAN electronic device has a DFS infrastructure connection. Furthermore, in order for an AWDL/NAN electronic device to operate in a DFS RF channel, the FCC requires that the AWDL/NAN peer listen to the DFS master (such as the infrastructure access point), which is not always possible.

In the communication technique, an AWDL/NAN electronic device that is associated with the DFS infrastructure access point may act as a DFS Proxy for one or more AWDL/NAN peer electronic devices (which are not associated with or connected to the infrastructure access point). The AWDL/NAN DFS proxy may relay DFS information received from the infrastructure access point to its peer electronic devices. The AWDL/NAN DFS proxy can also relay information about beacons for the access point to allow the peer electronic devices to monitor for beacons from the access point, even though the peer electronic devices are not associated with or connected to the access point directly. The AWDL/NAN DFS proxy can also relay information about the reception of beacons from the access point by the AWDL/NAN DFS proxy, such as an elapsed time since a most recently received beacon from the access point. The ADSL/NAN DFS proxy can also provide an indication of a maximum allowed time for no beacons to be received by either the ADSL/NAN DFS proxy or by a peer electronic device, e.g., a value for an interval threshold.

Figure 5:
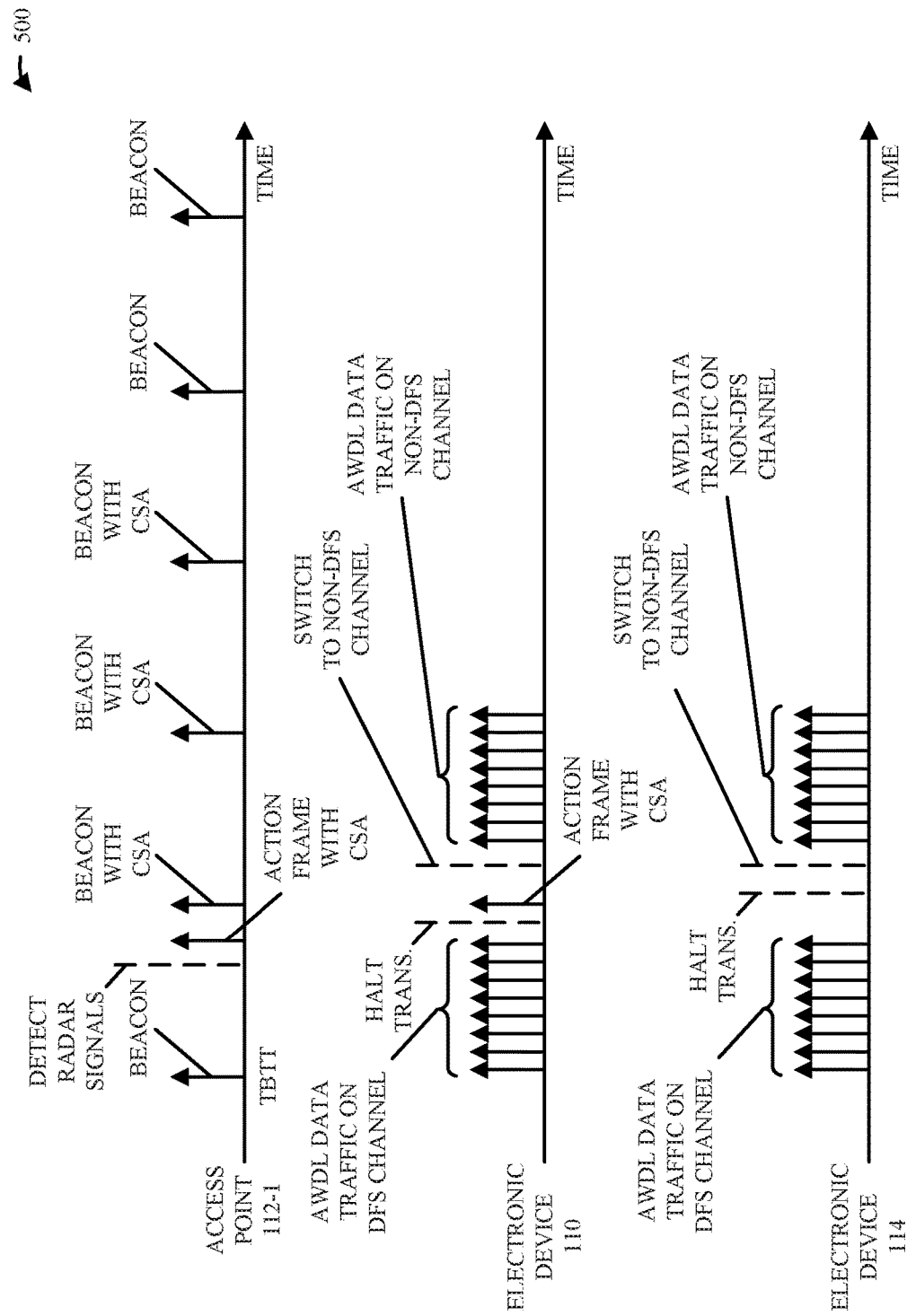
FIG. 5 is a timing diagram illustrating an example of communication between electronic devices, such as the electronic devices of FIG. 1.

FIG. 5 illustrates a timing diagram 500 of an example of communication between electronic devices, such as electronic device 110, access point 112-1 and electronic devices 114, in accordance with some embodiments. In particular, access point 112-1 (which is an infrastructure access point) may transmit beacons based on the target beacon transmission time (TBTT). Electronic device 110 may be associated with access point 112-1 (i.e., it may be an infrastructure client). Moreover, electronic device 110 may communicate data on a DFS RF channel with peer electronic device 114. Thus, communication may occur at times on one or more DFS RF channels, e.g., communication may occur on RF channel 149, and also may occur at times on one or more non-DFS RF channels, e.g., communication may occur on RF channel 52.

When access point 112-1 detects the presence of radar (e.g., weather or military radar), or the presence of similar higher priority users for the DFS RF channel, access point 112-1 may transmit an action frame that includes a channel switch announcement (CSA). In addition, subsequent beacons communicated by the access point 112-1 may include the CSA and/or DFS information.

In response, electronic device 110 may halt its transmit queue and its data transmission in the DFS RF channel and may forward or relay the CSA received from access point 112-1 in an action frame to electronic device 114 (i.e., electronic device 110 may be a DFS proxy for electronic device 114 in the shared band of frequencies). After receiving the CSA, electronic device 114 may also halt its own transmit queue and its own data transmissions in the DFS RF channel.

Furthermore, electronic devices 110 and 114 may switch to a non-DFS RF channel and may continue their data transmissions with each other.

When the AWDL/NAN peer electronic devices (such as electronic devices 110 and 114) have different infrastructure associations, additional options may be executed. When the AWDL/NAN peer electronic devices are on the same extended service set (ESS), e.g., both access points, to which the AWDL/NAN peer electronic devices are each individually associated, have the same ESSID (ESS identifier), one of the AWDL/NAN peer electronic devices may roam to the infrastructure access point of the other AWDL/NAN peer electronic device. Alternatively, the AWDL/NAN peer electronic device may try to roam to a 2.4 GHz infrastructure network. In some embodiments, the AWDL/NAN data link may mainly operate in social channel slots, which can be non-interference with higher priority users of DFS channels, (such as 75% of the time, which is used as an illustrative non-limiting example) and for the remainder (such as 25% of the time) may be quiet for the peer electronic devices to go to their respective infrastructure RF channel, which may be a DFS RF channel.

Figure 6:
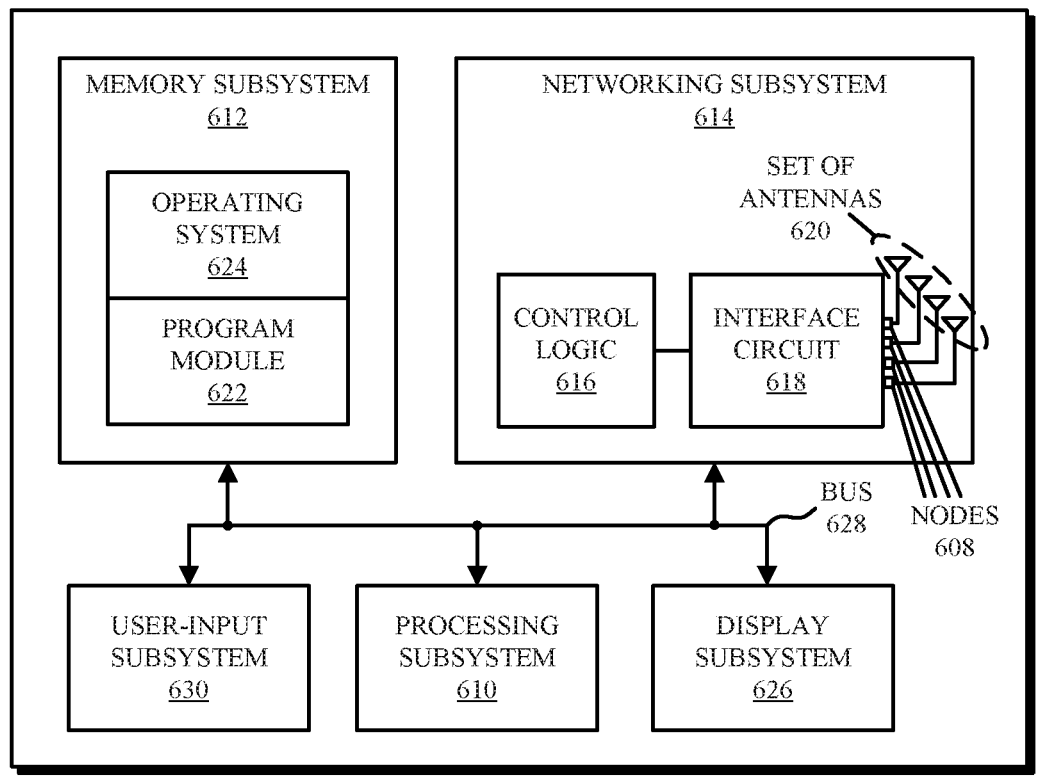
FIG. 6 is a block diagram illustrating an example of one of the electronic devices of FIG. 1.

FIG. 6 presents a block diagram of an electronic device 600 (which may be an access point, another electronic device, such as a station, a peripheral electronic device that communicates with the other electronic device or a legacy electronic device) in accordance with some embodiments. The electronic device 600 includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), a read-only memory (ROM), flash memory, and/or other types of memory. In some embodiments, instructions for processing subsystem 610 in memory subsystem 612 include: one or more program modules or sets of instructions (such as program module 622 or operating system 624), which may be executed by processing subsystem 610. For example, a ROM can store programs, utilities or processes to be executed in a non-volatile manner, and DRAM can provide volatile data storage, and may store instructions related to the operation of electronic device 600. Note that the one or more computer programs may constitute a computer-program mechanism, a computer-readable storage medium or software. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610. In some embodiments, the one or more computer programs are distributed over a network-coupled computer system so that the one or more computer programs are stored and executed in a distributed manner.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and a set of antennas 620 (or antenna elements) in an adaptive array that can be selectively turned on and/or off by control logic 616 to create a variety of optional antenna patterns or 'beam patterns.' (While FIG. 6 includes set of antennas 620, in some embodiments electronic device 600 includes one or more nodes, such as nodes 608, e.g., a pad, which can be coupled to set of antennas 620. Thus, electronic device 600 may or may not include set of antennas 620.) For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices.

Within electronic device 600, processing subsystem 610, memory subsystem 612, and networking subsystem 614 are coupled together using bus 628 that facilitates data transfer between these components. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc. Display subsystem 626 may be controlled by processing subsystem 610 to display information to a user (e.g., information relating to incoming, outgoing, or an active communication session).

Electronic device 600 can also include a user-input subsystem 630 that allows a user of the electronic device 600 to interact with electronic device 600. For example, user-input subsystem 630 can take a variety of forms, such as: a button, keypad, dial, touch screen, audio input interface, visual/image capture input interface, input in the form of sensor data, etc.

Electronic device 600 can be (or can be included in) any electronic device with at least one network interface. For example, electronic device 600 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. This integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol and a peer-to-peer communication technique as illustrative examples, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618. In an exemplary embodiment, the communication technique is implemented, at least in part, in a MAC layer and/or in a physical layer in interface circuit 618.

Representative Embodiments

In some embodiments, an electronic device includes: one or more nodes configured to communicatively couple to an antenna; and an interface circuit, communicatively coupled to the one or more nodes, configured to communicate with a second electronic device and with a third electronic device via a shared band of radio frequencies, and configured to: receive, from the second electronic device, information that indicates presence of interference associated with a higher priority user in the shared band of radio frequencies; and forward, to the third electronic device, an indication of the information, where the third electronic device is not associated with and does not have a connection to the second electronic device.

In some embodiments, the second electronic device includes an access point. In some embodiments, the information includes dynamic frequency selection (DFS) information. In some embodiments, the information is received in one or more of: an action frame with a channel switch announcement (CSA) or a beacon with a CSA. In some embodiments, the electronic device and the third electronic device communicate via a peer-to-peer communication technique. In some embodiments, the receiving involves a communication protocol in the shared band of radio frequencies that differs from a second communication protocol in the shared band of radio frequencies used during the forwarding. In some embodiments, the interface circuit is further configured to provide, to the third electronic device, a target beacon transmission time of the second electronic device to facilitate monitoring, by the third electronic device, of beacons transmitted by the second electronic device. In some embodiments, the interface circuit is further configured to: monitor for beacons received from the second electronic device; and communicate, to the third electronic device, an indication of an elapsed time since a most recently received beacon from the second electronic device. In some embodiments, the interface circuit is further configured to: communicate, to the third electronic device, information to allow the third electronic device to monitor beacons from the second electronic device; receive, from the third electronic device, an indication of an elapsed time for a most recently received beacon received by the third electronic device, and when: (i) the elapsed time since the most recently received beacon received by the electronic device from the second electronic device exceeds an interval threshold, and (ii) an indication received from the third electronic device indicates the elapsed time since the most recently received beacon received by the third electronic device from the second electronic device exceeds the interval threshold, stop data transmission with the third electronic device in the shared band of radio frequencies. In some embodiments, the interval threshold is based at least in part on a beacon interval between successive beacons for the electronic device.

In some embodiments, a non-transitory computer-readable storage medium stores instructions that, when executed by an interface circuit included in a mobile device, cause the mobile device to serve as a dynamic frequency selection (DFS) proxy with respect to a shared band of radio frequencies, by carrying out operations that include: (i) receiving, from an access point, information that indicates a presence of interference associated with a higher priority user in the shared band of radio frequencies; and (ii) forwarding, to a peer electronic device, an indication of the information, where the peer electronic device is not associated with and does not have a connection to the access point.

In some embodiments, the information includes dynamic frequency selection (DFS) information. In some embodiments, the information is received in one or more of: an action frame with a channel switch announcement (CSA) or a beacon with a CSA. In some embodiments, the receiving involves an IEEE 802.11 communication protocol in the shared band of radio frequencies that differs from a second communication protocol in the shared band of radio frequencies that is used during the forwarding. In some embodiments, the operations further include: providing, to the peer electronic device, a target beacon transmission time of the access point to facilitate monitoring, by the peer electronic device, of beacons transmitted by the access point. In some embodiments, the operations further include: monitoring for beacons received from the access point; and communicating, to the peer electronic device, an indication of an elapsed time since a most recently received beacon was received from the access point. In some embodiments, the operations further include: receiving, from the peer electronic device, indications of elapsed times for most recently received beacons received by the peer electronic device from the access point, and when: (i) the elapsed time since the most recently received beacon from the access point received by the electronic device exceeds an interval threshold, and (ii) an indication received from the peer electronic device indicates the elapsed time since the most recently received beacon received by the peer electronic device from the access point exceeds the interval threshold, stopping data transmission with the peer electronic device in the shared band of radio frequencies.

In some embodiments, a method for serving as a dynamic frequency selection (DFS) proxy with respect to a shared band of radio frequencies includes, by using an interface circuit in an electronic device associated with an access point, (i) receiving, from the access point, dynamic frequency selection (DFS) information that indicates a presence of interference associated with a higher priority user in the shared band of radio frequencies; and (ii) forwarding, to a peer electronic device, an indication of the DFS information, where the peer electronic device is not associated with and does not have a connection to the access point, and where the DFS information is received by the electronic device in one or more of: an action frame with a channel switch announcement (CSA) or a beacon with a CSA.

In some embodiments, the method further includes the interface circuit of the electronic device: monitoring for beacons received from the access point; and communicating, to the peer electronic device, an indication of an elapsed time since a most recently received beacon from the access point. In some embodiments, the method further includes the interface circuit of the electronic device: receiving, from the peer electronic device, indications of elapsed times for most recently received beacons received by the peer electronic device from the access point, and when: (i) the elapsed time since the most recently received beacon from the access point received by the electronic device exceeds an interval threshold, and (ii) an indication received from the peer electronic device indicates the elapsed time since the most recently received beacon received by the peer electronic device from the access point exceeds the interval threshold, stopping data transmission with the peer electronic device in the shared band of radio frequencies.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more nodes configured to communicatively couple to an antenna; and
   an interface circuit, communicatively coupled to the one or more nodes, configured to communicate with a second electronic device and with a third electronic device via a shared band of radio frequencies, and configured to:
      receive, from the second electronic device, information that indicates presence of interference associated with a higher priority user in the shared band of radio frequencies;
      forward, to the third electronic device, an indication of the information, wherein the third electronic device is not associated with and does not have a connection to the second electronic device;
      monitor for beacons received from the second electronic device; and
      communicate, to the third electronic device, an indication of an elapsed time since a most recently received beacon was received by the electronic device from the second electronic device.

2. The electronic device of claim 1, wherein the second electronic device comprises an access point.

3. The electronic device of claim 1, wherein the information comprises dynamic frequency selection (DFS) information.

4. The electronic device of claim 1, wherein the information is received in one or more of: an action frame with a channel switch announcement (CSA) or a beacon with a CSA.

5. The electronic device of claim 1, wherein the electronic device and the third electronic device communicate via a peer-to-peer communication technique.

6. The electronic device of claim 1, wherein receiving information involves a communication protocol in the shared band of radio frequencies that differs from a second communication protocol in the shared band of radio frequencies used during forwarding of the indication.

7. The electronic device of claim 1, wherein the interface circuit is further configured to provide, to the third electronic device, a target beacon transmission time of the second electronic device to facilitate monitoring, by the third electronic device, of beacons transmitted by the second electronic device.

8. The electronic device of claim 1, wherein the interface circuit is further configured to:
   communicate, to the third electronic device, information to allow the third electronic device to monitor beacons from the second electronic device;
   receive, from the third electronic device, an indication of an elapsed time for a most recently received beacon received by the third electronic device from the second electronic device, and
   when:
      the elapsed time since the most recently received beacon received by the electronic device from the second electronic device exceeds an interval threshold, and
      the indication received from the third electronic device indicates the elapsed time since the most recently received beacon received by the third electronic device from the second electronic device exceeds the interval threshold,
   stop data transmission with the third electronic device in the shared band of radio frequencies.

9. The electronic device of claim 8, wherein the interval threshold is based at least in part on a beacon interval between successive beacons for the electronic device.

10. A non-transitory computer-readable storage medium storing instructions that, when executed by an interface circuit included in an electronic device, cause the electronic device to serve as a dynamic frequency selection (DFS) proxy with respect to a shared band of radio frequencies, by carrying out operations that comprise:

receiving, from an access point, information that indicates a presence of interference associated with a higher priority user in the shared band of radio frequencies;

forwarding, to a peer electronic device, an indication of the information, wherein the peer electronic device is not associated with and does not have a connection to the access point;

monitoring for beacons received from the access point; and communicating, to the peer electronic device, an indication of an elapsed time since a most recently received beacon was received by the electronic device from the access point.

11. The non-transitory computer-readable storage medium of claim 10, wherein the information comprises dynamic frequency selection (DFS) information.

12. The non-transitory computer-readable storage medium of claim 10, wherein the information is received in one or more of: an action frame with a channel switch announcement (CSA) or a beacon with a CSA.

13. The non-transitory computer-readable storage medium of claim 10, wherein the receiving involves an IEEE 802.11 communication protocol in the shared band of radio frequencies that differs from a second communication protocol in the shared band of radio frequencies that is used during the forwarding.

14. The non-transitory computer-readable storage medium of claim 10, wherein the operations further comprise:

providing, to the peer electronic device, a target beacon transmission time of the access point to facilitate monitoring, by the peer electronic device, of beacons transmitted by the access point.

15. The non-transitory computer-readable storage medium of claim 10, wherein the operations further comprise:

receiving, from the peer electronic device, indications of elapsed times for most recently received beacons received by the peer electronic device from the access point, and when:
the elapsed time since the most recently received beacon from the access point received by the electronic device exceeds an interval threshold, and
an indication received from the peer electronic device indicates an elapsed time since a most recently received beacon received by the peer electronic device from the access point exceeds the interval threshold,
stopping data transmission with the peer electronic device in the shared band of radio frequencies.

16. A method for serving as a dynamic frequency selection (DFS) proxy with respect to a shared band of radio frequencies, the method comprising:

using an interface circuit in an electronic device associated with an access point:

receiving, from the access point, dynamic frequency selection (DFS) information that indicates a presence of interference associated with a higher priority user in the shared band of radio frequencies;

forwarding, to a peer electronic device, an indication of the DFS information, wherein the peer electronic device is not associated with and does not have a connection to the access point;

monitoring for beacons received from the access point; and communicating, to the peer electronic device, an indication of an elapsed time since a most recently received beacon was received by the electronic device from the access point.

17. The method of claim 16, further comprising the interface circuit of the electronic device:

receiving, from the peer electronic device, indications of elapsed times for most recently received beacons received by the peer electronic device from the access point, and when:
the elapsed time since the most recently received beacon from the access point received by the electronic device exceeds an interval threshold, and
an indication received from the peer electronic device indicates an elapsed time since a most recently received beacon received by the peer electronic device from the access point exceeds the interval threshold,
stopping data transmission with the peer electronic device in the shared band of radio frequencies.

18. The method of claim 16, wherein the DFS information is received by the electronic device in one or more of: an action frame with a channel switch announcement (CSA) or a beacon with a CSA.

19. The method of claim 16, wherein the interface circuit is further configured to provide, to the peer electronic device, a target beacon transmission time of the access point to facilitate monitoring, by the peer electronic device, of beacons transmitted by the access point.

20. The method of claim 16, wherein the electronic device and the peer electronic device communicate via a peer-to-peer communication technique.

* * * * *